United States Patent [19]
Palmer et al.

[11] Patent Number: 6,051,089
[45] Date of Patent: Apr. 18, 2000

[54] REINFORCING MEMBER FOR COMPOSITE WORKPIECES AND ASSOCIATED METHODS

[75] Inventors: Raymond J. Palmer, Newport Beach; Branko Sarh, Huntington Beach, both of Calif.

[73] Assignee: McDonnell Douglas Corporation, St. Louis, Mo.

[21] Appl. No.: 09/020,290

[22] Filed: Feb. 6, 1998

Related U.S. Application Data

[60] Provisional application No. 60/037,328, Feb. 7, 1997.

[51] Int. Cl.⁷ .......................................... B32B 7/08
[52] U.S. Cl. .......................... 156/92; 29/432; 156/303.1
[58] Field of Search ............................ 156/92, 93, 303.1; 29/432

[56] References Cited

U.S. PATENT DOCUMENTS

| | | |
|---|---|---|
| 2,510,693 | 6/1950 | Green . |
| 3,837,985 | 9/1974 | Chase ........................................ 156/92 |
| 3,927,443 | 12/1975 | Brumlik . |
| 3,981,051 | 9/1976 | Brumlik . |
| 4,180,890 | 1/1980 | Brumlik . |
| 4,206,895 | 6/1980 | Olez ........................................ 156/93 |
| 4,256,790 | 3/1981 | Lackman et al. ......................... 156/93 |
| 4,528,051 | 7/1985 | Heinze et al. ............................. 156/92 |
| 4,808,461 | 2/1989 | Boyce ..................................... 156/285 |
| 5,429,853 | 7/1995 | Darrieux ................................. 156/93 |
| 5,466,506 | 11/1995 | Freitas ..................................... 428/119 |
| 5,549,771 | 8/1996 | Brooker .................................. 156/153 |
| 5,589,015 | 12/1996 | Fusco ........................................ 156/92 |
| 5,759,321 | 6/1998 | Cahuzac .................................... 156/93 |
| 5,800,672 | 9/1998 | Boyce ........................................ 156/92 |
| 5,827,383 | 10/1998 | Campbell et al. ...................... 156/73.1 |
| 5,876,832 | 3/1999 | Pannell .................................... 428/119 |

FOREIGN PATENT DOCUMENTS

| | | |
|---|---|---|
| WO 96/20073 | 7/1996 | WIPO . |
| WO 97/16303 | 5/1997 | WIPO . |

*Primary Examiner*—Daniel Stemmer
*Attorney, Agent, or Firm*—Alston & Bird LLP

[57] ABSTRACT

Reinforcing members for securement of reinforced plastic composite components in restricted and confined space locations as a substitute for reinforcing stitching. The reinforcing members are highly effective for securing "T" stiffeners and the like to a skin structure in confined and restricted locations where a stitching machine cannot be used. The composite pieces which are reinforced and secured together by the reinforcing members provide excellent damage tolerance, are highly resistant to delamination and are resistant to tensile pulling and plane shear properties. The reinforcing members primarily comprise a plurality of pins or spikes which are effectively formed by sewing through a disposable and eliminatable core such that when the core is removed, all of the pins, which originally constituted threads passing through the core are secured together in an array by an open mesh physical cross-linking of the pins.

4 Claims, 3 Drawing Sheets

REINFORCING MEMBER FOR COMPOSITE WORKPIECES AND ASSOCIATED METHODS

CROSS-REFERENCE TO RELATED APPLICATION

This application claims the benefit of U.S. Provisional Application No. 60/037,328 filed Feb. 7, 1997.

FIELD OF THE INVENTION

This invention relates to fiber reinforced composite structures, and more particularly relates to reinforcing members for such composite structures.

BACKGROUND OF THE INVENTION

In relatively recent years, fiber reinforced composite parts have replaced parts and components previously made of structural metals, such as steel, aluminum and the like. This is particularly true in the aircraft industry, where it is recognized that the reinforced composite components can provide at least the same degree of strength and structural integrity as conventional materials, and oftentimes with significantly less weight and cost. Many of the reinforced components are made with reinforced cloth, which is ultimately formed to a desired shape, impregnated with a hardenable resin and cured to form a rigid structure.

The advantages achieved by stitching, such as, for example, loop stitching through fiber reinforced composite components for reinforcing two abutting components in a secured position and to resist delamination and peel forces, has been well established. See, for example, U.S. Pat. No. 4,256,790 to Lackman, et al., which teaches the sewing of a series of stitches through the thickness of panels while they are in a staged condition, which allows the two panels to be co-cured as assembled and form a strong reinforced composite structure. U.S. Pat. No. 4,206,895 to Olez, also discloses the strengthening of a joint in a bonded fiber structure of two or more fiber reinforced components by the use of high strength threads inserted through the joint.

Obtaining a three-dimensional reinforcement in a tight, restricted area, as, for example, between stiffeners and intercostals of a stiffened skin structure, is difficult, and in many cases, virtually impossible with conventional stitching machines. The use of stitching, as, for example, shown in the Olez U.S. Pat. No. 4,206,895, and in the Lackman, et al. U.S. Pat. No. 4,256,790, has improved damage tolerance and resistance to delamination, peel and tensile pull-off loads. Moreover, this three-dimensional stitching has been found to be effective in reducing in-plane shear in laminated structures.

Due to the size and construction of conventional stitching machines, however, the location and the overall size of the bobbins (or loopers, which are used in chain stitching) greatly restrict the area in which stitching may be accomplished. Consequently, in many areas where three-dimensional reinforcement would be desired, conventional automatic stitching is not an option because of the difficulty, if not impossibility, of operating the stitching machines in confined and restricted areas.

Tufting has also been considered as a means of three-dimensional reinforcement in confined and restricted areas. However, tufting is limited in that it does not retain the compaction of the dry fiber preforms which is achieved by conventional stitching which is not tufted.

Stapling, although having some advantages, is usually performed with staples formed of metal, and metal in certain cases may be unacceptable. As a simple example, metal components are electrically conductive, and electrical conductivity may be undesirable in certain applications. Effective thermoplastic staples are not yet available. There have even been attempts to make individual pins from carbon fibers and a thermoplastic resin, which are extruded. However, these pins are very costly to make, and furthermore, they are quite labor-intensive when installed, even though they may improve the desired properties of the components in which they are used.

U.S. Pat. No. 4,528,051 to Heinze, et al. discloses a method for strengthening fiber reinforced components using a multitude of metal or synthetic material pins driven into the layers of fibers and resin of adjacent structural components. The resin is then cured with the pins in place to improve the strength of the structural components and to prevent the peeling of one layer away from an adjacent layer. In certain embodiments, the pins are flexible and formed of Kevlar® thread. A stitching mechanism or sewing machine is used to insert the threads. As such, these embodiments suffer from the disadvantage noted above; namely, that the stitching operation cannot be performed in confined and restricted areas.

Other embodiments of the Heinze patent use stiff metal pins inserted in a pin carrier in the form a belt or webbing. The webbing may be bonded to one of the fiber reinforced composite components after the metal pins have been inserted. However, the use of conductive metal components can be disadvantageous as noted above. In addition, the highly flexible nature of the webbing can make the process of inserting the pins, unless applied using the illustrated roller apparatus, cumbersome and manually intensive.

Accordingly, there has been a need for a reinforcing member which can be used for securing two or more reinforced components together in restricted and confined areas. More specifically, there has been a need for a reinforcing member which can be used for securing intercostals and stiffeners ("T" stiffeners in 0°, 90° or other orientations relative to one another) to a reinforced plastic skin, particularly in confined and limited spaces. Such a reinforcing member would preferably be non-conductive and be capable of being fairly easily integrated into the reinforced composite structure.

SUMMARY OF THE INVENTION

The present invention relates in broad terms to a method of making a reinforced composite reinforcing member capable of securing one or more reinforced composite pieces. As indicated previously, the invention is effective in actually securing two or more reinforced composite pieces together.

Very frequently, it is necessary to secure components, such as intercostals and stiffeners to preforms, that is, reinforced composite parts which may be in dry stitched fiber near-net shape preform condition or may be pre-impregnated, but which have not yet been cured to a final or C-stage.

In accordance with the method of the invention, the method comprises providing a central core which is capable of being removed from the reinforcing member when the latter is formed in the core. The method comprises stitching a plurality of fiber reinforcing threads at closely spaced apart locations through this removable core. In this case, the threads are relatively straight when they penetrate the core.

The method also comprises the physical cross-linking one of the common ends of each of the threads with a connecting member. In other words, the common ends of each of the threads are secured together in the stitching operation in a physical cross-linking, thus forming an open mesh supporting structure. This cross-linking of the threads forms a grid in the open mesh structure where the common ends of the thread are secured to the grid, and the opposite ends are free ends of the threads which will ultimately be provided with points for penetrating into a reinforcing member, such as a preform.

After the stitching has been completed in the core, the threads passing through the core are hardened in a manner to be hereinafter described, and thereby form generally straight pins which are connected to one another by the aforesaid cross-linking grid. After the grid with the pins has been formed in the core, the structure or grid is ready to be stabilized.

In a preferred embodiment, the reinforcing member is formed of reinforced composite reinforcing threads, such as glass, Kevlar®, carbon fiber threads, etc. However, they are not necessarily initially impregnated with a curable matrix, such as a resin. After formation in the core, they can then be impregnated with a curable matrix, and hardened.

After the grid with the pins integral therewith have been formed, one advantageous step of the method of the invention is to provide a sharpened point on the free ends of each of the pins so that they are capable of penetrating into a preform. It has been found in accordance with the present invention that when the free ends or second ends of the pins are ground to bevelled angle, e.g., 45°, with respect to the central axis of the pins, that penetration into a preform is greatly enhanced.

The core is then removed. Removal of the core may take place by any of a number of procedures. In one advantageous embodiment, the core is a foam core which may be dissolvable, either in a polar or a non-polar liquid solvent. Thus, after hardening of the reinforcing member with the core in place, the entire reinforcing member can be introduced into the liquid where the core itself becomes dissolved.

In another embodiment of the invention, the core may adopt the form of a foam material which is capable of being rapidly degraded and disintegrated in the presence of heat. Thus, curing of the resin and elimination of the core can take place in a single operation, such that the heat virtually destroys the foam material to thereby cause removal of same.

The reinforcing member of the invention is effective in that it can be used in a tightly restricted area where space is not available to achieve the stitching obtained by a conventional stitching machine. Although the three dimensional stitching is highly effective, it has been found that by using a three-dimensional reinforcement of the type provided in accordance with this invention, there is an excellent influence on damage tolerance and delamination. There has been found to be a substantial increase in peel strength resistance, tensile pull-off and in-plane shear properties. Moreover, by using these reinforcing members, the properties obtained are similar to those acquired with conventional stitching. The entire reinforced structure may then be impregnated with resin and cured by conventional methods to develop the desired mechanical properties.

This invention possesses many other advantages and has other purposes which may be made more clearly apparent upon consideration of the forms in which it may embodied. One of the forms of the method and one of the actual reinforcing members is more fully illustrated in the accompanying drawings, and described in the following detailed description. However, it is to be understood that these accompanying drawings and this detailed description are set forth only for purposes of illustrating the general principles of the invention, and are not to be taken in a limiting sense.

BRIEF DESCRIPTION OF THE DRAWINGS

Figure 1:
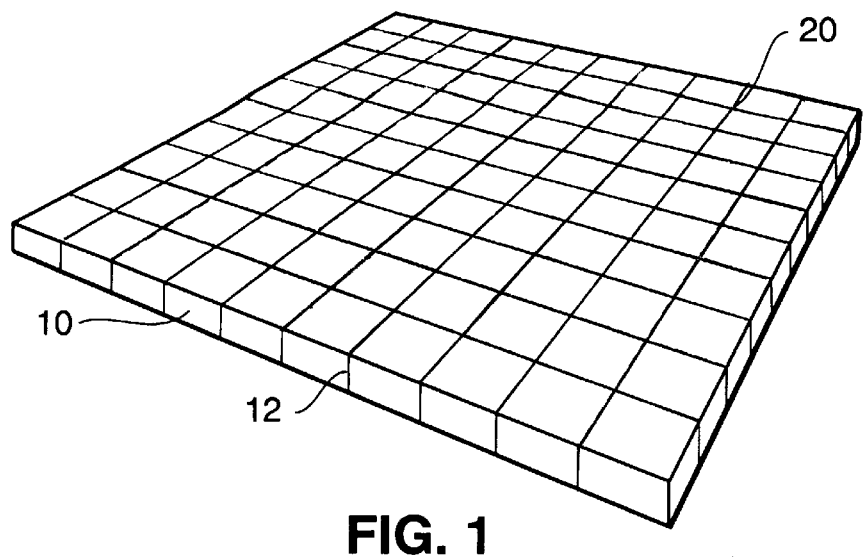
Figure 2:
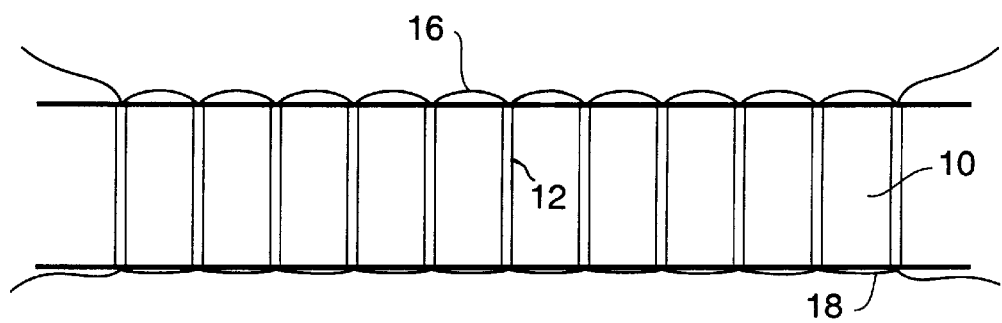
Figure 3:
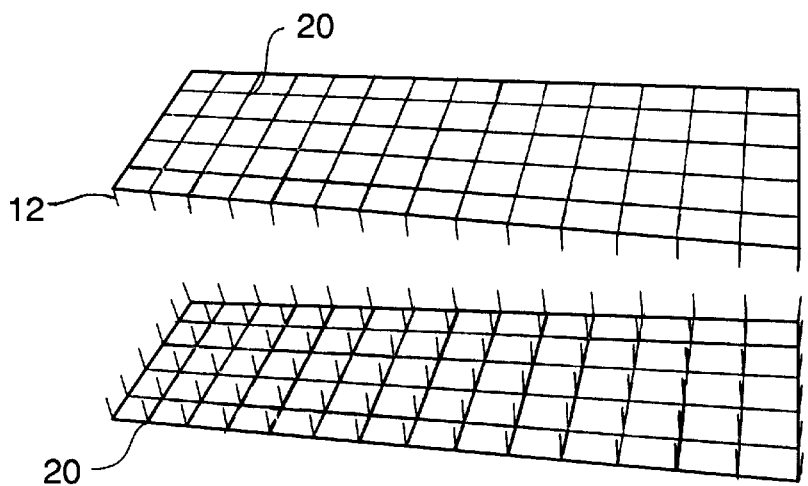
Figure 4:
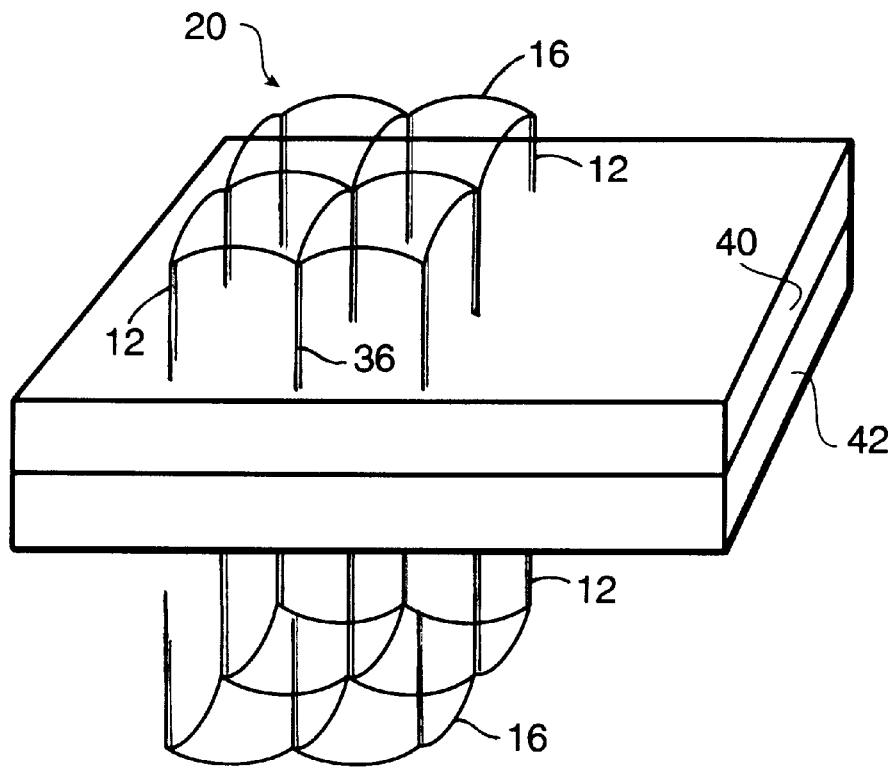
Figure 5:
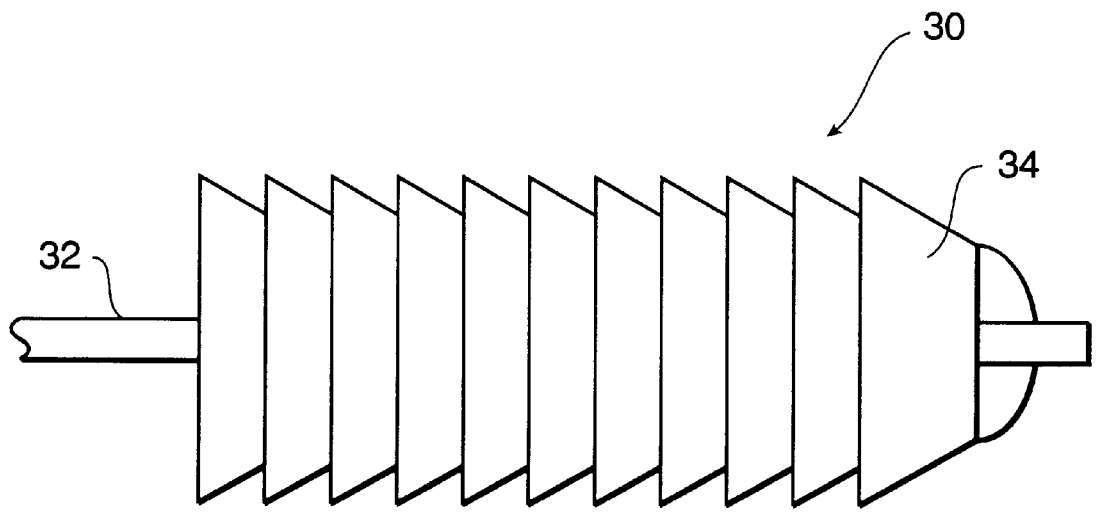
Figure 6:
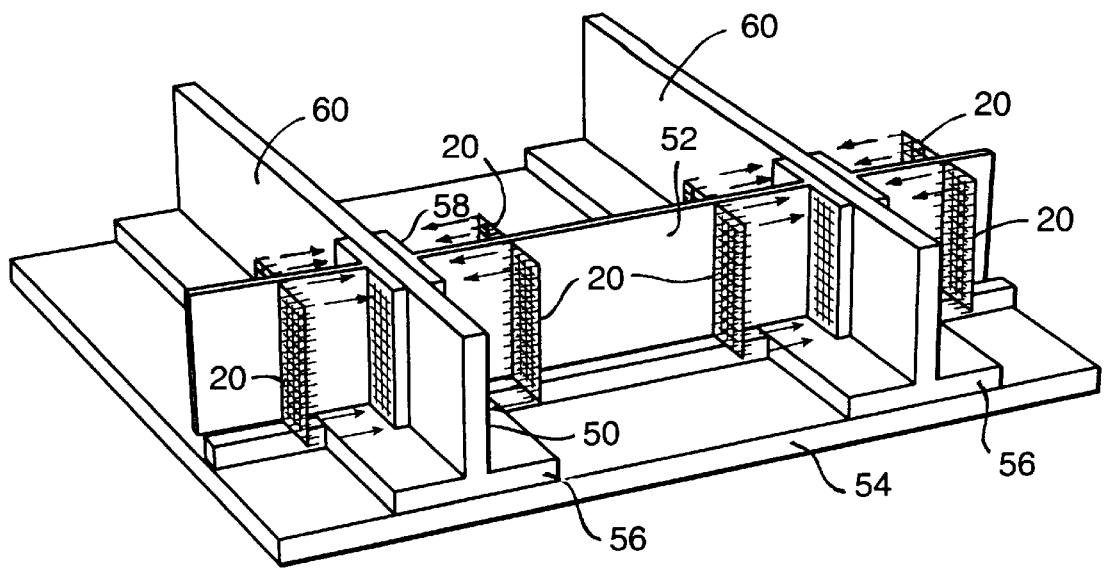
Figure 7:
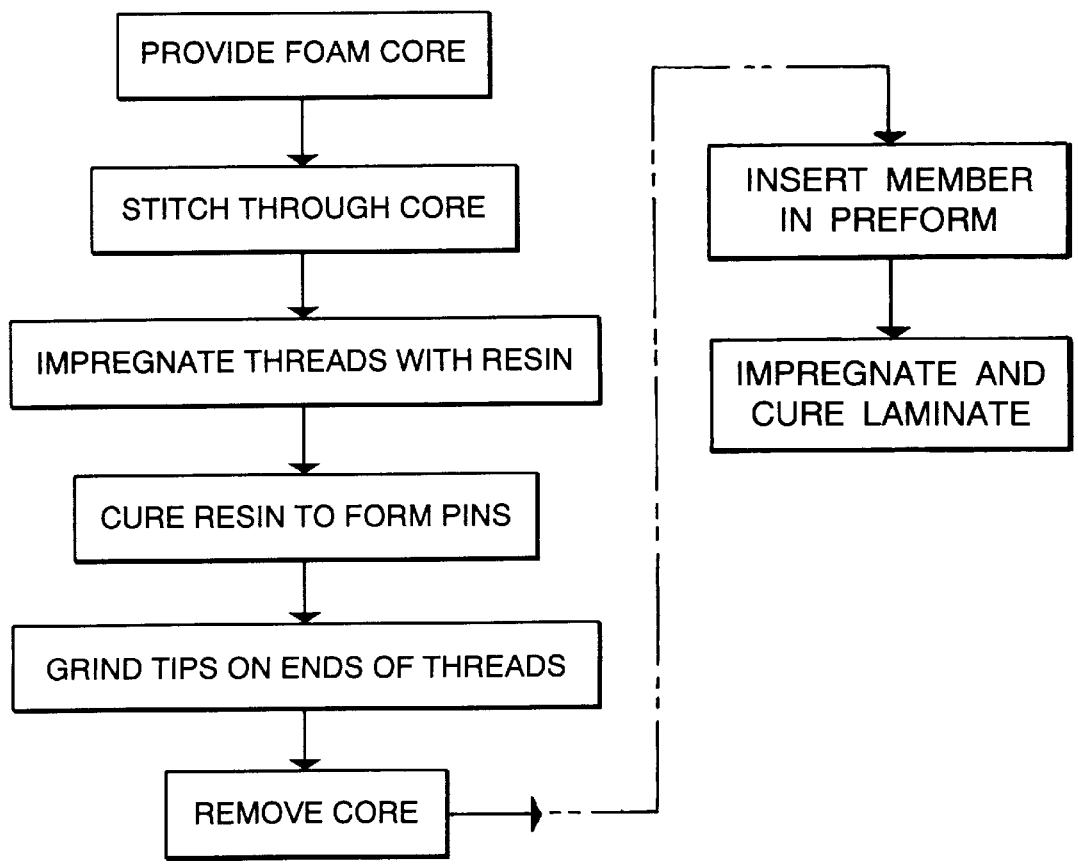

Having thus described the invention in general terms, reference will now be made to the accompanying drawings in which:

FIG. 1 is a perspective view showing the formation of a reinforcing member in a removable core in accordance with the present invention;

FIG. 2 is a side-elevational view of the reinforcing member formed in a core and being comprised of needle threads and bobbin threads;

FIG. 3 is a perspective view of a pair of opposed completely formed reinforcing members in accordance with the present invention;

FIG. 4 is an enlarged schematic perspective view showing the attachment of two components with reinforcing members in accordance with the present invention;

FIG. 5 is a side view of a grinding tool for cutting the free ends of the pins forming part of the reinforcing member in accordance with the present invention; and FIG. 6 is a fragmentary schematic perspective view showing the use of reinforcing members for securing stiffeners and intercostals to a skin structure in accordance with the present invention; and FIG. 7 is a flow chart showing the steps involved in the method of the present invention.

DETAILED DESCRIPTION

Referring in more detail and by reference characters to the drawings which illustrate a preferred embodiment of the present invention, FIGS. 1, 2 and 7 show a method of making a reinforced plastic composite reinforcing member in accordance with the invention.

Referring now to FIG. 1, it can be seen that a core, which is a removable core, such as a foam core 10, is provided. Using conventional stitching techniques with a conventional stitching machine (not shown), the foam core 10 is provided with pin-forming threads 12 extending from the upper surface of the core to the bottom surface thereof. These pin-forming threads have a length equal to the thickness of the foam core, usually between ¼th inch and 1 inch. With regard to stitch density, the stitch fibers can have a spacing of about ⅛th of an inch, with a ⅕th inch step. As such, each row will have 8 stitches per inch and there will be 5 stitch rows per inch. If the stitching is rotated 90° and the same stitch pattern is repeated, it will provide an overall stitch density of 80 penetrations per square inch. However, it will be appreciated that the density of the stitches can vary.

Individual columns of stitches are first formed, that is, from one transverse side to the opposite transverse side of the foam core. Thereafter, the foam core is rotated 90° and stitching occurs from one longitudinal side to the opposite longitudinal side. This produces a grid of stitches in a generally square or rectangular array. However, it is not necessary that the reinforcing member of the present invention be formed of an array of rows and columns, but may simply be formed of a single row for certain applications.

By reference to FIGS. 1 and 2 of the drawings, it can be seen that when the fibers are impregnated and cured, each of the threads forms a vertical pin 12 extending through the foam core 10. Each of the stitches will form a connecting member 16 from the needle thread at the upper ends as shown. These extend between and connect each of the individual pin-forming threads 12 which, in effect, form relatively rigid pins, as hereinafter described. At their lower ends, bobbin threads 18 are formed, and which also may initially connect each of the individual pin-forming threads elements 12 on the bottom side of the foam core 10. The example shown is of a two thread stitch including an upper penetration needle thread and a lower locking thread supplied by a standard "lock" stitch sewing technique. A single thread chain stitch machine may be used to form the grid from a single thread if desired.

The connecting member threads 16, in combination, all form a reinforcing member 20 in the form of a physical cross-linking grid structure for each of the pins 12, and connect each of the pins in this grid-like arrangement. In this respect, the reinforcing member 20 is an open mesh structure such that each of the pins 12 is integrally formed with and extends outwardly from connecting members 16 at an angle of about 90° thereto.

The threads are preferably formed of any suitable fiber material of the type used in reinforced plastic composites, and include, for example, fiberglass, carbon, and the like. The thread may also be comprised of various size tows. Some of the other threads which may be used include Kevlar, Dacron, and nylon. The composite yarns in the dry fiber condition are sufficiently flexible to be sewn through the core. The same threads impregnated with a dry, flexible "B" stage resin, compatible with the resin used by the final laminate may also be used to form the grid.

In the process of making the reinforced plastic composite reinforcing members, the structure obtained in accordance with FIG. 2 is then resin impregnated with a suitable thermosetting resin. Again, any of the resins normally used in reinforced plastic composites may be used for this purpose.

Curing of the resin impregnated thread stitches may then occur with any conventional curing mechanism. Typically, with most resins, when heated, the resins will cure to a C-stage where the composite is in a rigid stage. In this condition, the threads 12 become relatively rigid pins.

After the formation of a relatively rigid reinforcing member 20 which is still imbedded in the foam core 10, the bobbin threads 18 are effectively removed and the ends of the pins 12 are ground with a tool 30 of the type as shown in FIG. 5. In this case, it can be seen that the tool 30 is provided with an elongate shank or handle 32 and has a plurality of tapered grinding heads 34 with sharpened circular edges having a ⅛th inch spacing in this case. As these grinding heads 34 grind against the lower ends of the stitches 12, they will provide a tapered end and preferably a 45°±30° angled cut on the ends of each of the pins 12 relative to the central axis of the pin 12. This enables each pin 12 to satisfactorily and readily penetrate a preform with minimum structural fiber damage to the preform. Moreover, the ⅛th inch spacing of the various pins is accurate and in one pass, a tool 30 will sharpen all of the pins.

At this point in the process, the core 10 is removed in order to obtain a reinforcing member of the type shown in FIGS. 3 and 4. In this case, it can be seen that the reinforcing member 20 comprises the grid structure having the individual pins 12 extending outwardly therefrom. Moreover, each of the free ends 36 of the pins 12 are tapered. The reinforcing member 20 is an open mesh grid structure, as aforesaid, and allows some flexibility in enabling the pins to conform to irregularities in the surface contour of the reinforced plastic preform in which the pins are to be inserted.

The foam which is used is for the core 10 is preferably a polystyrene foam. With this material, solvents may be used to dissolve the foam or otherwise heat may be used to degrade and effectively destroy the foam. Similarly, a core made of wax having a high melting temperature (such as 350° F.) could be used. The resin in the reinforcing member 20 is cured at approximately 250–300° F. and thus the wax core can be melted from the reinforcing member after the reinforcing member has been at least partially cured. Any remaining wax can be cleaned away with a degreasing unit. Other suitable core materials include liquid soluble components such as a water soluble rigid foam or soft plaster.

The tensile strength of the formed pins is over 250,000 psi. By comparison, the maximum tensile strength of any injection molded pin or rod is roughly 30,000 to 40,000 psi. Thus, resistance to tensile pull-off, delamination and peel is great when using an oriented fiber reinforcing thread as according to the present invention.

FIG. 4 illustrates an arrangement in which two composite sheet workpieces 40 and 42 are disposed in facewise engagement and may be reinforced by means of one or two reinforcing members 20 of the type created in accordance with the present invention. Thus, and in this case, the two sheets 40 and 42 are preforms and the pins on each of the opposed reinforcing members 20, will be inserted into each of the preforms to thereby physically hold the same together. In this respect, it should be understood in connection with the present invention that the reinforcing members 20 are highly effective with preforms. The preform workpieces 40, 42 may be either in a wet or a dry form. Thus, they may be pre-impregnated but not cured until the reinforcing members 20 have been positioned in place. Moreover, they can be dry and ultimately impregnated when the reinforcing members 20 have been located in a reinforcing position.

FIG. 6 shows an arrangement in which the reinforcing members are used to secure the stringers 50 and the web flanges 58 of the intercostals 52 together. This framework thus provides support for a preform sheet 54. FIG. 6 shows the use of reinforcing members 20 in accordance with the present invention being secured to a web flange 58 of the intercostal 52 and into the web 60 of the respective stringer 50. Although not specifically shown in FIG. 6, additional reinforcing members could be used for securing the base flange 56 of the stringers 50 to the sheet 54 to obtain extra localized strength properties. In addition, the joints between the various components may have been stitched, to the extent practicable, prior to the application of the reinforcing members 20 of the present invention to compact the respective preforms.

When using the reinforcing members 20 of the invention, the pins 12 are inserted into the relatively soft preform material and then all of the components are subjected to curing as, for example, by heating. As this occurs, the resin impregnated into the preform workpiece and into or around the pins and the grid of the reinforcing member will cause a fusing or bonding of the reinforcing member to the preform and become an integral part of the structure.

FIG. 7 shows an overall step procedure of making and installing the 3-D grid into a preform and final resin impregnation and cure to make the desired enhanced damage-tolerant structure. Thus, there has been illustrated and described a unique and novel method of making and applying a 3-D grid reinforced plastic composite reinforcing member which thereby fulfills all of the objects and advantages which have been sought.

It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

That which is claimed:

1. A method of securing a pair of workpieces to each other, said method comprising the steps of:

positioning a first workpiece;

positioning a second workpiece such that a first face of the second workpiece is in face-to-face contact with the first workpiece and an opposite second face is spaced therefrom by the thickness of the second workpiece;

positioning, adjacent to the second face of the second workpiece, a reinforcing member having a connecting member and a plurality of pins, the connecting member and pins being formed of a hardened fiber reinforcing thread and each pin having an end integrally connected to said connecting member and an opposite free end;

pressing the free ends of the pins of the reinforcing member through the second workpiece and into the first workpiece to secure the second workpiece to the first workpiece.

2. A method of securing workpieces as defined in claim 1 wherein the steps of positioning the first and second workpieces further comprise positioning first and second workpieces formed of a fiber reinforced composite material.

3. A method of securing workpieces as defined in claim 2 comprising the further steps of impregnating the workpieces with a curable resin and then, after said step of pressing the pins into the workpieces, curing the workpieces to create a rigid reinforced structure.

4. A method of securing workpieces as defined in claim 3 wherein said impregnating step is performed after said step of pressing pins into the workpieces.

* * * * *